United States Patent
Jovanovski et al.

(10) Patent No.: US 10,621,397 B2
(45) Date of Patent: Apr. 14, 2020

(54) INTELLIGENT INDICIA READER

(75) Inventors: Brian Jovanovski, Syracuse, NY (US); Daniel Van Volkinburg, Syracuse, NY (US); Alexey Chernyakov, Ithaca, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 129 days.

(21) Appl. No.: 12/817,246

(22) Filed: Jun. 17, 2010

(65) Prior Publication Data
US 2011/0309150 A1      Dec. 22, 2011

(51) Int. Cl.
*G06K 7/10*      (2006.01)

(52) U.S. Cl.
CPC ..... *G06K 7/10554* (2013.01); *G06K 7/10722* (2013.01); *G06K 2207/1017* (2013.01)

(58) Field of Classification Search
CPC ........... G06K 7/10554; G06K 7/10722; G06K 2207/1017
USPC ....... 235/455, 435, 454, 484, 462.01–462.49
See application file for complete search history.

(56) References Cited

U.S. PATENT DOCUMENTS

| | | | |
|---|---|---|---|
| 5,569,901 A | 10/1996 | Bridgelall et al. | |
| 5,608,202 A * | 3/1997 | Bridgelall et al. | 235/462.06 |
| 6,616,039 B1 * | 9/2003 | Saporetti et al. | 235/455 |
| 6,616,049 B1 | 9/2003 | Barkan et al. | |
| 7,077,321 B2 | 7/2006 | Longacre et al. | |
| 2002/0117547 A1 * | 8/2002 | Krichever | 235/462.01 |
| 2003/0057282 A1 * | 3/2003 | Brandt et al. | 235/462.07 |
| 2004/0062438 A1 | 4/2004 | Jia | |
| 2004/0206821 A1 * | 10/2004 | Longacre et al. | 235/462.07 |
| 2005/0056699 A1 | 3/2005 | Meier et al. | |
| 2006/0011724 A1 * | 1/2006 | Joseph et al. | 235/454 |
| 2006/0274171 A1 | 12/2006 | Wang | |
| 2007/0108284 A1 | 5/2007 | Pankow et al. | |
| 2007/0228137 A1 | 10/2007 | Bhella et al. | |
| 2008/0209411 A1 | 8/2008 | Koziol et al. | |

FOREIGN PATENT DOCUMENTS

| | | |
|---|---|---|
| CN | 1080073 A | 12/1993 |
| CN | 1947125 A | 4/2007 |

OTHER PUBLICATIONS

European Search Report from European Patent Office for related Application No. 11169191.1-2210, dated Sep. 23, 2011.
Examination Report from European Patent Office for related Application No. 11169191.1-2210, dated Oct. 7, 2011.
Office Action in European Application No. 11169191.1, dated Jul. 18, 2013, 3 pages.

(Continued)

*Primary Examiner* — Laura A Gudorf
(74) *Attorney, Agent, or Firm* — Alston & Bird LLP

(57) ABSTRACT

Operating an indicia reader configured for hand held operation by a user is performed by controlling the indicia reader according to a plurality of configuration setting to: scan information bearing indicia (IBI); provide output scan signals representative of the IBI; attempt to decode IBIs from the output scan signals; tracking a plurality of decoding attempts and the at least one configuration setting used during the decoding attempts; and changing at least one of the plurality of configuration settings in response to the tracking without user intervention.

11 Claims, 3 Drawing Sheets

(56) References Cited

OTHER PUBLICATIONS

First Office Action in related Chinese Application No. 201110207977.7, dated Feb. 13, 2015, provided with English Translation, 20 pages.
Second Office Action in related Chinese Application No. 201610351003.9, dated Nov. 27, 2018, 5 pages.
English-translation of Second Office Action in related Chinese Application No. 201610351003.9, dated Nov. 27, 2018, 9 pages.
First Chinese Office Action for Application No. 201610351003.9, dated Feb. 24, 2018, 28 pages.
Second Chinese Office Action for Application No. 201110207977.7, dated Sep. 29, 2015, 12 pages.

* cited by examiner

INTELLIGENT INDICIA READER

FIELD OF THE INVENTION

The present invention relates to indicia reading devices, and more particularly to an indicia reader with learning capabilities.

BACKGROUND

Indicia reading devices (also referred to as scanners, laser scanners, image readers, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) indicia readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an indicia reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or transceiver for communicating with a remote computer.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Exemplary methods may be conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures." While one or more of these terms may find favor in the present description, there is no intention to limit the invention to the described embodiments.

In general, the sequences of steps in the present methods require physical manipulation of physical quantities. These quantities take the form of optical, electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a computer or DSP (Digital Signal Processor), but may also be implemented in a hardware processor. For example, the methods may be implemented with HDL (Hardware Design Language) in an ASIC.

Figure 1:
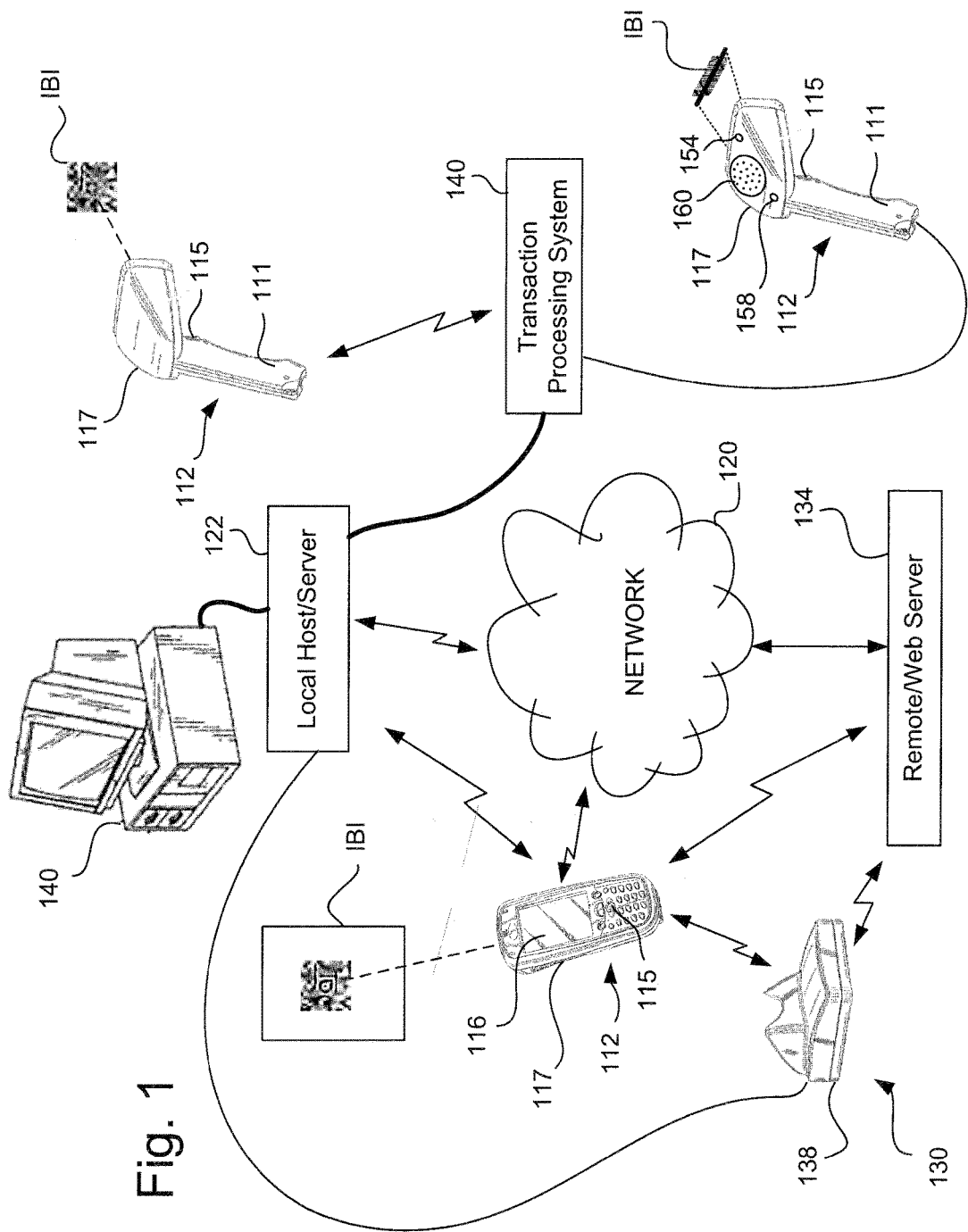
FIG. 1 is a block diagram of an exemplary indicia reader system.

FIG. 1 illustrates an exemplary scanning system, wherein a plurality of indicia readers 112 are operated and utilized where information bearing indicia (IBI) are present. The indicia readers may be stationary or hand-held and may be either laser indicia reading devices (or laser scanners) utilizing transmitted laser light or optical indicia reading devices utilizing image capturing devices for extracting data from IBIs.

An operator may aim a hand-held indicia reader 112 at a target containing an IBI, dataform, text, or other data to be collected and actuate a button or trigger 115 on the indicia reader to control full or partial operation of the reader, such as to activate scanning of an IBI. An IBI or dataform may be an originally machine generated symbology that is also machine readable, such as a 1-D barcode, a 2-D barcode, a 1-D stacked barcode, a logo, glyphs, color-codes, and the like.

An exemplary indicia reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet.

An exemplary indicia reader 112 may have a number of subsystems supported by a housing 117 configured to be hand held, such as by utilization of a handle portion 111. An exemplary indicia reader 112 may have a number of feedback subsystems for providing an operator with feedback as to operation or functionality of the reader. Exemplary indicia reader feedback subsystems may be a display 116 for providing visual feedback, a LED 154 for providing visual feedback, a beeper 158 for providing audio feedback or a speaker 160 for providing audio feedback.

Exemplary indicia readers may be in communication (wired or wireless) to a local transaction processing system 140, such as a cash register, store station or employee station or local host/server 122 directly or through a charging station or base 138. An exemplary local server 122 or indicia reader 112 may be in communication with network 120 and or a remote/web server 134.

In an exemplary embodiment, the indicia reader may identify particular barcodes according to rules defined by an establishment, such as a store to provide store customers distinctive and perceivable barcode read notices which may be customized as desired. A notice may be received once a targeted barcode is scanned for fast identification of the particular barcodes. The customer may easily get scan information in a perceivable way.

An exemplary use of an indicia reader is as the primary or sole scanner at a customer point of transaction (POT) in an establishment. Primary may mean the scanner at a POT is used to scan or image items more often than any other scanner or imager at the POT. A transaction may be any of a number of events that occur between a customer and an establishment, such as a store. The events may involve such things as exchange of monetary funds, payment for merchandise or service, return of merchandise, picking up merchandise that has already been paid for, or contracting for a service (such as leasing or renting).

As the primary scanner, merchandise with indicia may be read by it so that data decoded therefrom may be used for a stock keeping system (such as SKU) functionality such as sales, price look up, inventory, etc.

Figure 2:
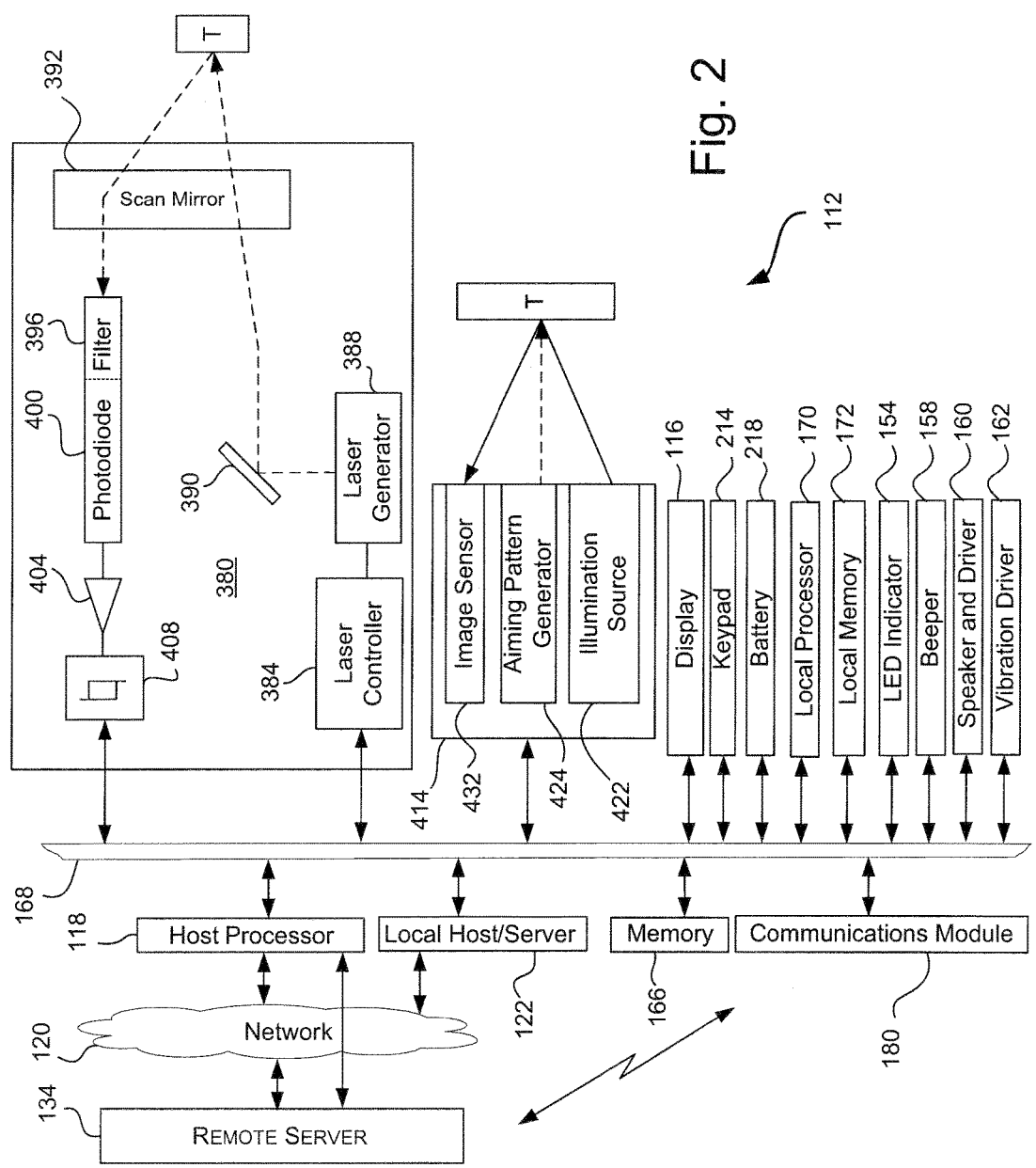
FIG. 2 is a perspective view of an exemplary indicia reader scanning near and far indicia.

FIG. 2 illustrates an exemplary indicia reader 112 may comprise a number of exemplary subsystems, such as laser scan engine 380 or laser scanning reader system for reading indicia on a target T. The laser scanning reader system may comprise a laser controller 384 for controlling a laser generator 388 for generating a laser light beam which is directed onto a folding mirror 390 which then directs the laser light beam to an oscillating or rotating scan mirror 392 to project a scanning pattern onto target T. The laser scanning pattern is reflected off of the target and redirected by scan mirror 392 into a receive path comprising a laser light pass filter 396, a photodiode 400, an amplifier 404 and a digitizer 408.

Laser light may be described as a spatially coherent, narrow low-divergence beam of light.

Digitizer 408 may convert an analog signal output by the photodiode into a digital signal representative of the light reflected off of the targets.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader is rapidly varied in brightness with a data pattern and the photodiode receive circuit is designed to detect only signals with the same modulated pattern.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream, including decoding of IBIs.

An exemplary indicia reader 112 my comprise one or more optical image engines (image indicia reader systems or optical scan engines) 414 for reading indicia on a target T. Optical image engines capture and read images to detect and decode IBIs located within the captured images. The optical image indicia reader systems may comprise one or more illumination source(s) 422 for illuminating an IBI with a beam or pattern of incoherent light in the form of an illumination pattern, an image sensor 432 for converting light reflected off a target T having an IBI provided thereon into representative output signals thereof and an aiming pattern generator 424 for projecting an aiming pattern on the target. The output signal of the image sensor may be processed utilizing one or more functions or algorithms to condition the signal appropriately for use in further processing downstream, including decoding of IBIs.

An exemplary image sensor converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The imager may be either a progressive or interleaved imager. The image sensor may contain an array of light sensitive photodiodes (or pixels) that convert incident light energy into electric charge. Many solid state image sensors also allow regions of a full frame of image data to be addressed.

An exemplary image sensor may use a monocolor image sensor that may include a filter element defining color sensitive pixel elements dispersed throughout an array of monochrome pixels. Operation of the monocolor image sensor is to subsample color images (monochrome or full color) utilizing associated optimal sensor settings for image capture or symbology scanning. Exemplary monocolor image sensors are described in U.S. Patent Publication Number 20060274171 entitled DIGITAL PICTURE TAK- ING OPTICAL READER HAVING HYBRID MONOCHROME AND COLOR IMAGE SENSOR ARRAY the entirety of which is hereby incorporated herein by reference.

Other exemplary reader subsystems or components supported by the housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more local processor(s) 118, a local host/server 122, local memory 166, network 120 or remote server host/server 134.

Communications module 180 may provide a communication link from imaging reader 112 to other indicia readers or to other systems such as a server/remote processor 134.

An exemplary processor may be a mixed-signal array with on-chip controller devices designed to replace multiple traditional MCU-based system components with one single-chip programmable device. It may include configurable blocks of analog and digital logic, as well as programmable interconnects.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon configuration settings stored in firmware or memory which may be any one of a number of memory types such as RAM, ROM, EEPROM, etc. In addition some memory functions may be stored in memory provided as part of the processor(s). Configuration settings may be arranged as parameter tables.

Exemplary functions of the processor(s) may be controlling operation the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding is a term used to describe the interpretation of a machine readable code contained in the photodetector output signal. The processor(s) may be located on board or within the housing with other subsystems.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the reader will use.

Two exemplary scanning modes may be continuous or discontinuous. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous scans one after another (seriatim) and continuously decodes or attempts to decode some or all scanned targets. Discontinuous mode is a mode wherein scanning and/or decoding stops or is interrupted and initiated with an actuation event, such as pulling of a single pull trigger 115, a timeout, or a successful read to restart. An exemplary utilization of the reader in discontinuous mode is via hand held operation. Decoding stops once the indicia reader is no longer triggered. The discontinuous mode is typically initiated because the operator knows a symbol is present.

Exemplary indicia readers may use memory or firmware to store reader settings or reader configuration settings.

Exemplary configuration settings are:
the current port utilized to send output data over
address buffer space in which scan data will be stored
whether scanning is to be continuous or discontinuous
codes which are enabled for processing
aiming pattern center coordinates
aimer configuration
aiming system power output
optical reader configuration
optical reader orientation
number of pixels in the image to be used for initializing buffers
engine orientation
field illumination
information regarding lens distortions
information regarding image distortion
dead or bad imager pixels
image sensor noise corrections within the image processing algorithm
Illumination LED current
receiving lens prescription or parameters
whether the imager is enabled for image capture
what type of decoder level is enabled
what types of symbology decoding is enabled
scanning distance
trigger functionality
pre-defined bar code output data based on the scan input
continuous scanning mode
discontinuous scanning mode or routine
decoding mode or routine
I/O configurations
min/max symbology character lengths
scan engine selection
illumination control
settings that affect the functional operation of the processor(s)
aimer operation
engine orientation
illumination
photosensor control
speaker control
beeper control
notification LED control software control
sales tracking
warranty tracking
scanner capabilities
exposure gain In an exemplary embodiment, an indicia reader tracks and saves configuration settings that achieve successful indicia reads most often. The reader may track all attempted indicia reads, record the configuration settings associated with the most amount of successful reads and recognize configuration setting patterns that resulted in the successful reads. If there is a pattern of similar settings that result in the most amount of valid reads then those settings may be set as default or pre-set configuration settings for each scan attempt. Future scan attempts will with those settings will be optimal and provide optimal read times, thereby reducing the time to reach optimal settings and allowing the control processor(s) to dedicate more processing resources to decoding functions and less to making scanning adjustments to adapt to the internal and external environments. Changing configuration settings may be done automatically without intervention by the user.

In an exemplary embodiment, a reader may also identify and classify the types of symbols read in a customer application and the configuration settings associated with successful reads of those types of symbols. The configuration settings with the most often good reads may be set as default or pre-set configuration settings for future scan attempts to minimize or limit code type search delay times.

Figure 3:
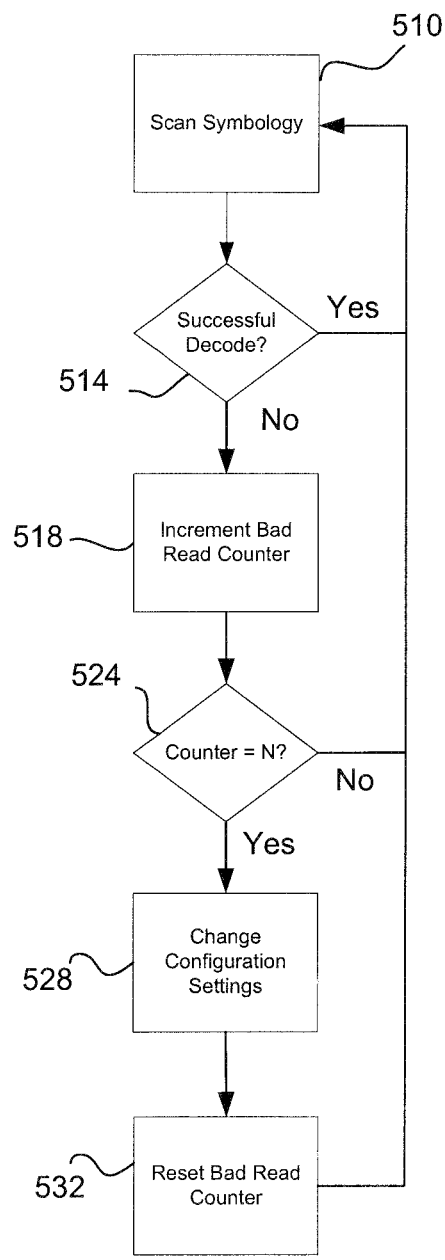
FIG. 3 is a simplified schematic block diagram of an exemplary indicia reader.

FIG. 3 is a flowchart of an exemplary method of operating an indicia reader, wherein a reader scans a symbology in a step 510. A query is made in a step 514 if the reader was able to decode the symbology. If not, a bad read counter is incremented in a step 518. A query is made in a step 524 if the counter has reached a number N. If yes, the reader changes at least one configuration setting in a step 528, resets the bad read counter in a step 532 and takes another scan in step 510.

In an exemplary embodiment, configuration settings are changed in a predetermined order or sequence that is programmed into the indicia reader software at manufacturing. The order or sequence may be changed or set by a customer or user after manufacturing in a manner described herein for changing configuration settings.

In an exemplary embodiment, configurations settings may be stored in a number of parameter tables that differ from one another by having one more differing configuration settings. The indicia reader may change or switch parameter tables in a predetermined order.

In an exemplary embodiment, the reader may change a single configuration setting at a time. If a particular configuration setting has multiple values or increments, the indicia reader may change the configuration setting in graduating increments.

In an exemplary embodiment, an indicia reader may be configured by reading IBIs from a user's application to configure the reader for future scans. For example, a user may scan a particular symbology in a particular environment. The reader may change the configuration settings in response to the scan and wait for the next scan. If the reader scans later scans a different symbology or scans in a different environment or scans the same type of symbology in a different environment, the reader may change the configuration settings in response to the one or more new scanning conditions.

Examples of types of symbols and preferential configuration settings for those symbol types include:

| Symbol Type/Environment | Optimal Configuration Settings |
| --- | --- |
| Low contrast barcode label | high exposure gain, longer exposure and high LED current |
| Retail label | short exposure time, pulsed LED, and low exposure gain |
| Reflective label | select decoding algorithm that can reconstruct labels from multiple images and change illumination source angle |
| High ambient light | higher aiming pattern intensity, low exposure time and low exposure gain |

An exemplary embodiment of an indicia reader configured for hand held operation by a user comprises a scanning engine for scanning information bearing indicia (IBI) and providing output image signals representative thereof;

at least one memory space for storing: output scan signals; at least one decoding program for decoding IBIs from the stored output scan signals; at least one operating program for controlling operation of the indicia reader; a plurality of configuration settings; a tracking program for tracking the decoding of IBIs and the configuration settings when decoding occurs; a configuration changing program for changing configuration settings; and, at least one processor for executing: the at least one decoding program and the at least one operating program in accordance with the configuration settings, the tracking program, and the configuration changing program, wherein the at least one processor executes the configuration setting program to change at least one configuration setting in response to the tracking program independent of user input.

An exemplary method of operating an indicia reader configured for hand held operation by a user is performed by controlling the indicia reader according to a plurality of configuration setting to: scan information bearing indicia (IBI); provide output scan signals representative of the IBI; attempt to decode IBIs from the output scan signals; tracking a plurality of decoding attempts and the at least one configuration setting used during the decoding attempts; and changing at least one of the plurality of configuration settings in response to the tracking without user intervention.

Readers may be configured via serial connection using serial commands. A GUI interface may be utilized for creating or reading serial commands, such as Visual Menu or similar such product. This may be done locally or remotely by connecting the optical reader either directly or through a network (such as the internet) to a remote computer and having the remote computer provide software upgrades.

Software upgrades may be necessary for migration from one reader to new or other readers, possibly different manufacturers. Upgrading may be simplified if the configuration of the reader being replaced is matched or matches the configuration of the equipment that it is replacing.

If reader software is replaced, the reader may have the ability to automatically read out configuration settings information in memory and allow the software to adapt and use different methods of control, or different methods of decoding, etc.

An exemplary embodiment for upgrading may be to provide a PC based software tool to read out the non-default configuration settings from a target reader device (the one being replaced) through a serial communication and then to flash the same or equivalent settings into the replacement equipment. This may be considered a direct configuration mapping method, that is, reading the configuration settings on a (old) Device A and flashing them into a (new) Device B.

Another exemplary embodiment may be to provide a PC based software tool that analyzes output scanned data of a known information bearing indicia from a target reader (the one being replaced) and compares it with the output scanned data from the replacement reader. The software tool may interpret how the existing device is configured based on the difference between the two sets of scanned data. After interpolation of the configuration settings of the replacement reader, the software tool would configure the replacement reader to match the old or replacement reader. This may be considered indirect mapping, wherein the software tool interpolates the inner settings of an existing device from its operation, rather than by direct read out from memory or firmware.

Either exemplary embodiment may be integrated with a cross-browser, client-side DHTML menu builder such as Visual Menu. The configuration of a reader may be read out once and then propagated many times using wireless or over-the-net configuration utilities, hard copy or video display menuing or other suitable means.

A user may update or replace one or more configuration settings or configuration setting data utilizing a remote updating system which may be done by connecting the reader either directly or through a network (such as the internet) to a remote processor. With appropriate software, the remote processor may be programmed to read configuration settings from the reader, such as software configuration. The remote processor may read the configuration setting data and utilize that data when downloading updates or new software. An operator may request from the remote processor for a software update. The request would be received by either computer, which could read the current software configuration resident on the optical reader and determine the appropriate update or replacement software.

Readers and a host system may be equipped with the ability to automatically query and communicate data, such as configuration settings or firmware amongst each other. Upgrading firmware from host to reader and duplicating configuration settings may be performed without user intervention to ensure readers are operating at the same revision and have the same configuration settings reduces user frustration, down time, data integrity and increase efficiencies.

At predetermined time intervals a host system may broadcast various information, such as firmware revision, configuration settings, etc. The host may then download the newer files and update readers during a time of inactivity. Readers may use on board memory or firmware flash memory to store configuration settings.

Additional configuration settings that may be input to compliment the set up scanned symbologies may be instructions to effectuate check characters, append modes and other decoding peripherals.

A method of configuring indicia readers is described in commonly owned U.S. Pat. No. 7,077,321 entitled PORTABLE AUTODISCRIMINATING OPTICAL READER, the entirety of which is hereby incorporated herein by reference.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. An indicia reader comprising:
    a scanning engine for scanning information bearing indicia (IBI) and providing output scan signals representative thereof;
    at least one memory space for storing:
        the output scan signals;
        at least one decoding program for decoding the IBI from the output scan signals;
        at least one operating program for controlling operation of the indicia reader;
        a plurality of configuration settings, wherein each of the plurality of configuration settings corresponds to a different operational parameter of the indicia reader and wherein each of the plurality of configuration settings corresponds to only one operational parameter of the indicia reader;
        a tracking program for tracking the decoding of the IBI and the plurality of configuration settings of the indicia reader during the decoding of the IBI;
        a configuration changing program for changing the configuration settings; and,
    at least one processor for executing:
        the at least one decoding program and the at least one operating program in accordance with the plurality of configuration settings,
        the tracking program, and
        the configuration changing program,
        wherein for each unsuccessful attempt to decode an IBI, the at least one processor executes the configuration changing program to change a value of a configuration setting of the plurality of configuration settings to generate a plurality of changed configuration settings, wherein the at least one processor is configured to cause the scanning engine to rescan the IBI based on the plurality of changed configuration settings,
        wherein the configuration changing program selects the configuration setting of the plurality of configuration settings, for changing, in a predetermined sequence independent of a user input,
        wherein the predetermined sequence is changeable by a user, wherein the predetermined sequence defines an order by which the configuration changing program selects the configuration setting of the plurality of configuration settings after each unsuccessful decoding attempt, and
        wherein the tracking program tracks all attempted decoding of IBIs, stores values of the plurality of configuration settings in the at least one memory space, and sets default values of the plurality of configuration settings with the values of the plurality of configuration settings that resulted in maximum successful decoding of an IBI type, wherein the configuration changing program automatically sets the plurality of configuration settings to the default values based on the IBI type of the IBI being scanned.

2. An indicia reader in accordance with claim 1, wherein the values of the plurality of configuration settings are stored in a plurality of differing parameter tables, and the configuration changing program changes the parameter tables.

3. An indicia reader in accordance with claim 2, wherein the configuration changing program changes parameter tables in the predetermined sequence.

4. An indicia reader in accordance with claim 1, wherein when the configuration changing program changes the configuration setting, the value of the configuration setting is changed in graduating increments.

5. A method of operating an indicia reader comprising:
controlling the indicia reader according to a plurality of configuration settings to:
scan an information bearing indicia (IBI);
provide output scan signals representative of the IBI;
attempt to decode IBIs from the output scan signals;
tracking a plurality of decoding attempts and the plurality of configuration settings of the indicia reader during the plurality of decoding attempts, wherein the tracking comprises:
storing values of the plurality of configuration settings corresponding to each of the plurality of decoding attempts,
setting default values of the plurality of configuration settings with the values of the plurality of configuration settings that resulted in a maximum successful decoding of an IBI type, wherein the values of the plurality of configuration settings of the indicia reader are automatically set to the default values based on the IBI type of the IBI being scanned; and
for each unsuccessful decoding attempt, changing a value of a configuration setting of the plurality of configuration settings to generate a plurality of changed configuration settings, wherein the IBI is rescanned based on the plurality of changed configuration settings,
wherein changing the value of the configuration setting comprises selecting the configuration setting of the plurality of configuration settings, for changing, in a predetermined sequence independent of a user input, wherein the predetermined sequence is changeable by a user, wherein the predetermined sequence defines an order by which the configuration changing program selects the configuration setting of the plurality of configuration settings after each unsuccessful decoding attempt,
wherein each of the plurality of configuration settings corresponds to a different operational parameter of the indicia reader, and wherein each of the plurality of configuration settings corresponds to only one operational parameter of the indicia reader.

6. A method of operating an indicia reader in accordance with claim 5, wherein the plurality of configuration settings are stored in a plurality of differing parameter tables, and the configuration changing program changes the parameter tables.

7. A method of operating an indicia reader in accordance with claim 6, wherein the parameter tables are changed in the predetermined sequence.

8. A method of operating an indicia reader in accordance with claim 5, wherein the value of the configuration setting is changed in graduating increments.

9. A method of operating an indicia reader comprising:
scanning and decoding a first information bearing indicia (IBI) of a first IBI type according to first values of a plurality of configuration settings;
scanning a second IBI of a second IBI type according to second values of the plurality of configuration settings;
attempt decoding of the second IBI;
in response to unsuccessful decoding of the second IBI, changing a second value of a configuration setting of the plurality of second configuration settings to generate a plurality of changed configuration settings, without an intervention of a user, based upon a predetermined sequence defined by the user;
rescanning and reattempting the decoding of the second IBI based on the plurality of changed configuration settings;
in response to unsuccessful decoding of the second IBI, changing a second value of another configuration setting of the plurality of second configuration settings based on the predetermined sequence and repeating rescanning and reattempting the decoding of the second IBI until the second IBI is successfully decoded;
tracking a plurality of decoding attempts and a plurality of configuration settings of the indicia reader during the plurality of decoding attempts, wherein the tracking comprises:
storing values of the plurality of configuration settings corresponding to each of the plurality of decoding attempts,
setting default values of the plurality of configuration settings with the values of the plurality of configuration settings that resulted in a maximum successful decoding of an IBI type, wherein the values of the plurality of configuration settings of the indicia reader is automatically set to the default values based on the IBI type of an IBI being scanned, wherein first values of the plurality configuration settings corresponds to the default values of the plurality of configuration settings associated with the first IBI type and the second values of the plurality of configuration settings corresponds to the default values of the plurality of configuration settings associated with the second IBI type.

10. A method of operating an indicia reader in accordance with claim 9, wherein the first values the plurality of configuration settings is associated with a first ambient environment of the indicia reader and the second values of the plurality of configuration settings is associated with a second ambient environment of the indicia reader.

11. A method of operating an indicia reader in accordance with claim 10, wherein the first and second ambient environment is lighting conditions.

* * * * *